United States Patent [19]

Waxman

[11] 4,451,709
[45] May 29, 1984

[54] EYE GLASS HEARING AIDS

[75] Inventor: Ronald Waxman, Highland Park, Ill.

[73] Assignee: Beltone Electronics Corporation, Chicago, Ill.

[21] Appl. No.: 333,032

[22] Filed: Dec. 21, 1981

[51] Int. Cl.³ .............................................. G02C 11/06
[52] U.S. Cl. ............................ 179/107 S; 179/107 H; 181/22
[58] Field of Search ......... 179/107 S, 107 R, 107 FD, 179/107 H; 181/22, 130, 129, 135, 131, 196

[56] References Cited

U.S. PATENT DOCUMENTS

| 3,193,048 | 6/1965 | Kohler | 179/107 S |
| 3,665,121 | 5/1972 | Weiss | 179/107 S |

FOREIGN PATENT DOCUMENTS

| 1049919 | 2/1959 | Fed. Rep. of Germany | 179/107 S |
| 1117650 | 3/1959 | Fed. Rep. of Germany | 179/107 S |
| 1066621 | 10/1959 | Fed. Rep. of Germany | 179/107 S |
| 2371698 | 7/1978 | France | 179/107 S |
| 1057853 | 9/1963 | United Kingdom | 179/107 S |

OTHER PUBLICATIONS

"The New, Flexible Answer . . . ," Advertisement, Hearing Instruments, Dec. 1980.

Primary Examiner—G. Z. Rubinson
Assistant Examiner—L. C. Schroeder
Attorney, Agent, or Firm—Allegretti, Newitt, Witcoff & McAndrews, Ltd.

[57] ABSTRACT

An eyeglass hearing aid including a channel having a serpentine shape for providing a compact acoustical path for extending the path of sound transmission. A sweat guard is positioned around a volume control aperture formed on the upper surface of the eyeglass aid. Alignment structure serves to fix a curved printed circuit board in position relative to the flat lower surface of the paddle portion of the eyeglass aid. These particular structures are incorporated in an eyeglass hearing aid in order to utilize a printed circuit board of a behind-the-ear hearing aid and to provide the same frequency response as a behind-the-ear aid.

9 Claims, 5 Drawing Figures

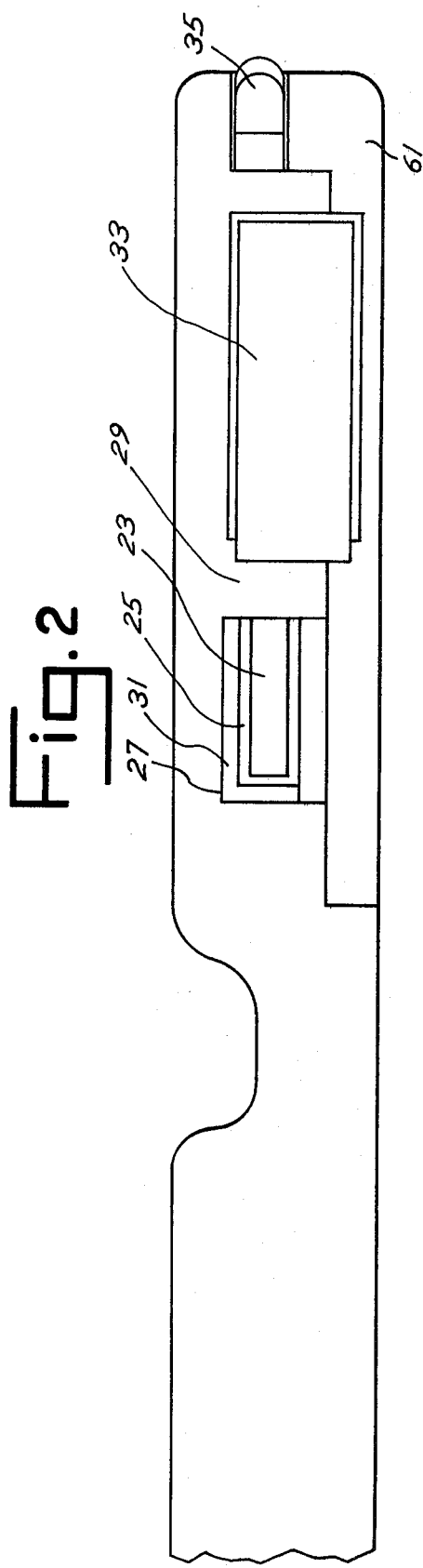
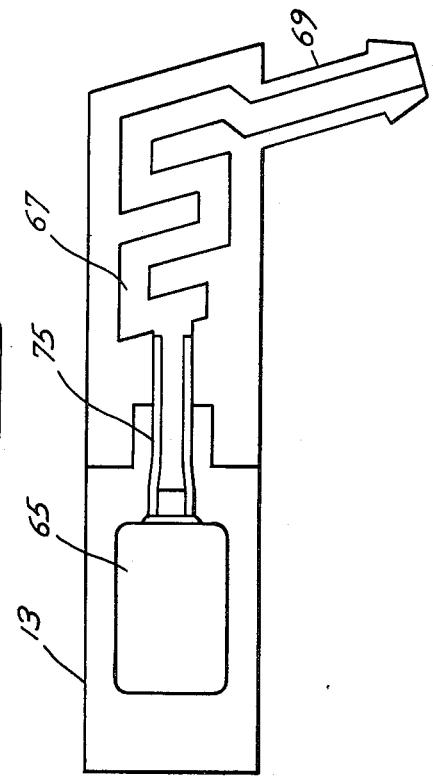
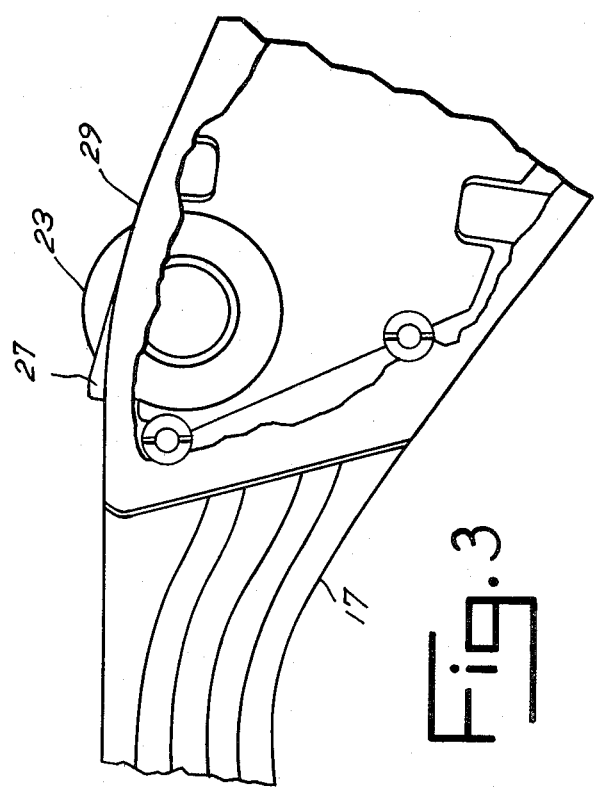

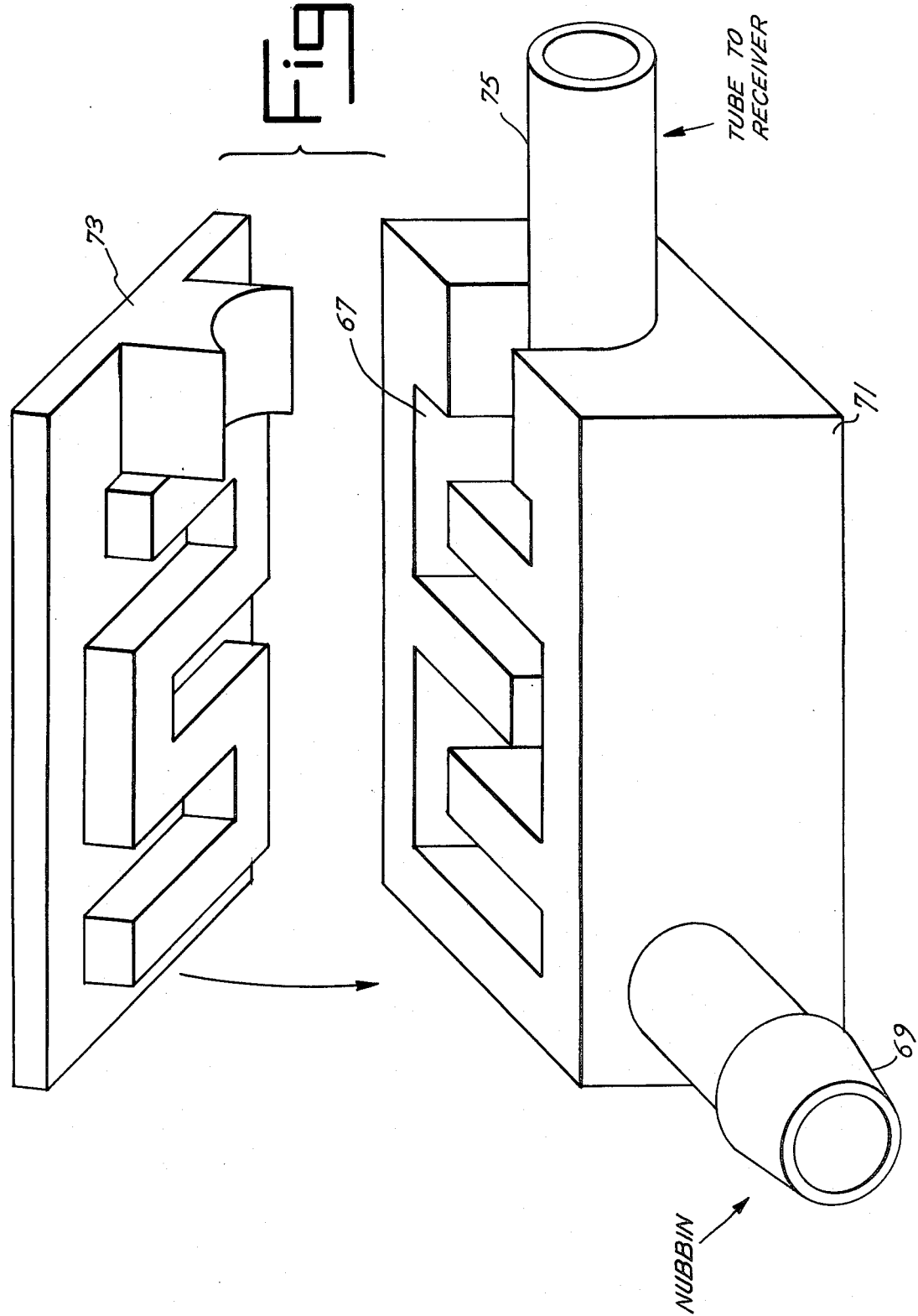

EYE GLASS HEARING AIDS

BACKGROUND OF THE INVENTION

The present invention relates to hearing aids and more particularly to an improved structure for eyeglass hearing aids.

Manufacturers of hearing aids produce a variety of hearing aids, including behind-the-ear hearing aids and eyeglass hearing aids. The structure of an eyeglass hearing aid includes an elongated temple portion which extends from the lens portion of the eyeglass and ends in a paddle portion positioned behind the wearer's ear. The paddle portion houses a printed circuit board holding the electrical circuitry of the aid. A relatively short piece of tubing extends from a sound outlet on the temple portion to an ear mold positioned within the wearer's ear.

A behind-the-ear hearing aid also includes a circuitry housing structure, but unlike the eyeglass aid, the housing structure is positioned close to the ear conforming in shape to the ear's curvature. This type of hearing aid has a relatively long piece of hollow, curved rigid plastic which hooks over the ear serving to hold the aid in place and also to conduct sound. Flexible plastic tubing is attached to this rigid plastic for connecting with an ear molding which conducts the sound into the ear.

Because of the different lengths of the acoustic path within these two types of hearing aids, the frequency response which is dependent on tube length, is different for the two types of hearing aids. Also, the two aids are different in that the housing for each aid is shaped differently. The behind-the-ear aid has a curved shape for conforming the circuit board to the housing structure which fits the curvature of the ear. The eyeglass hearing aid has a straighter contour for pleasing styling and comfort.

It would be highly desirable to provide an improved eyeglass hearing aid which may utilize the printed circuit board of a behind-the-ear aid. This would result in the elimination of manufacturing two different printed circuit boards for the marketing of two different types of aids.

As discussed above, the problems of utilizing a behind-the-ear circuit in an eyeglass hearing aid includes change in frequency response characteristics and circuit board shape. Further, the volume control knob of the behind-the-ear aid would take on a new position in the top surface of the eyeglass stem if the behind-the-ear circuit board were fitted within the eyeglass paddle portion. With the volume control knob positioned on the upper surface of the eyeglass stem, moisture due to sweat, and the like, would tend to run into the volume control of the aid possibly fouling the operation of the electrical circuitry of the board.

Therefore, it is an object of the present invention to provide an improved eyeglass hearing aid.

It is yet a further object of the present invention to provide improved structure for an eyeglass hearing aid in order to overcome the problems of utilizing a behind-the-ear circuit board in an eyeglass hearing aid.

It is a further object of the present invention to provide an eyeglass hearing aid which includes structure for affecting the frequency response of the aid to provide the same frequency response as a behind-the-ear aid.

It is yet a further object of the present invention to provide an eyeglass hearing aid which includes structure for permitting the use of a curved printed circuit board of the type used in the behind-the-ear hearing aid.

It is a further object of the present invention to provide structure for eliminating sweat or moisture from entering the volume control aperture mounted on the top surface of an eyeglass hearing aid.

SUMMARY OF THE INVENTION

In one embodiment of the invention, a channel having serpentine shape provides a compact acoustical path for extending the path of sound transmission. In another form of an embodiment, a sweat guard is positioned around the control aperture formed on the upper surface of the eyeglass aid. In another form of an embodiment, alignment structure serves to fix the curved printed circuit board of a behind-the-ear aid in position relative to the flat lower surface of the paddle portion of the eyeglass aid.

BRIEF DESCRIPTION OF THE DRAWINGS

FIG. 2 is an enlarged partial top view of the paddle portion of FIG. 1;

FIG. 3 is an enlarged partial cutaway view of the paddle portion of FIG. 1;

FIG. 4 is a cutaway side view of the receiver and channel of the aid of FIG. 1; and FIG. 5 is a perspective view of the channel of FIG. 4.

DESCRIPTION OF THE PREFERRED EMBODIMENT

Figure 1:
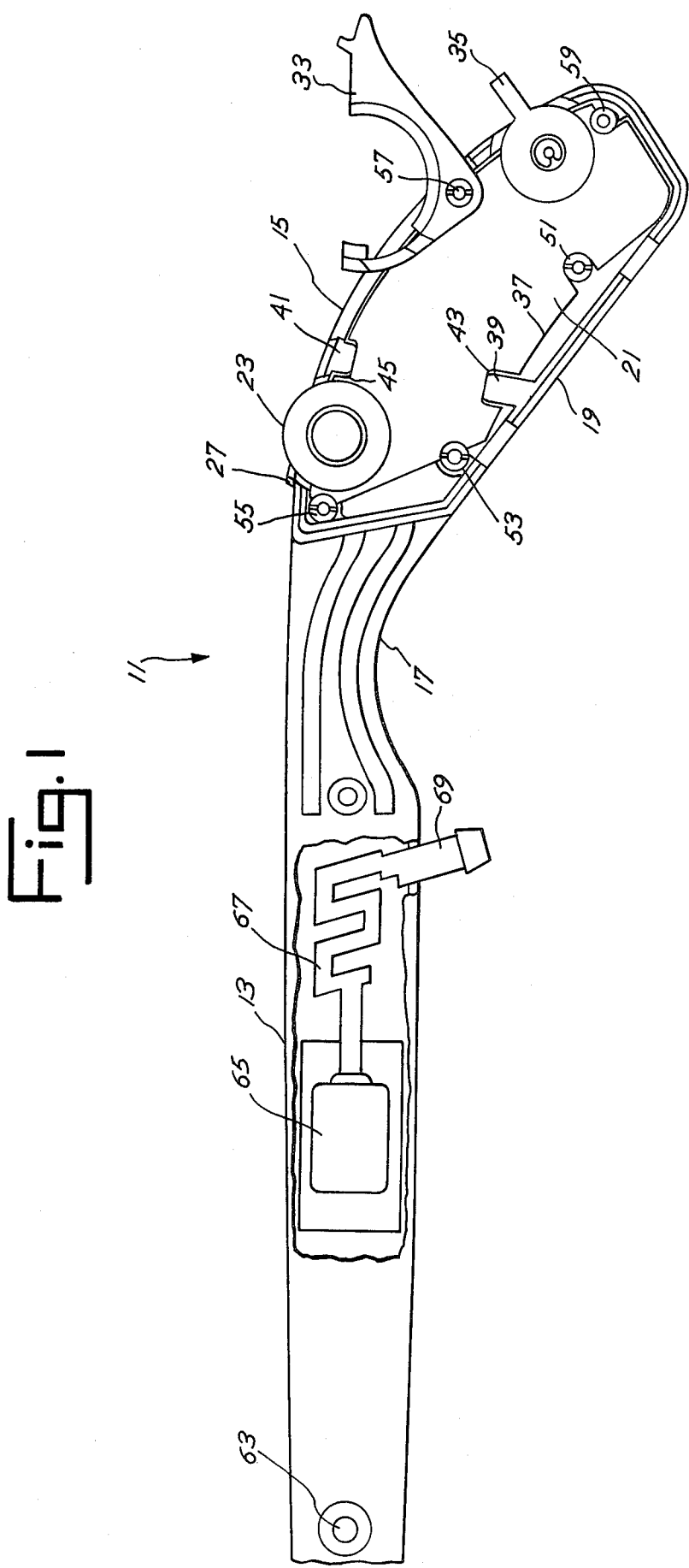
FIG. 1 is a side view of an eyeglass hearing aid embodiment of the present invention, in which a side portion is removed and another portion of the side is broken away.

Referring to FIGS. 1 and 2, eyeglass hearing aid 11 includes a temple portion 13 and a paddle portion 15 which may be formed as one unit from plastic. As understood, temple portion 13 is formed with a curvature 17 which rests atop the wearer's ear. Paddle portion 15 extends to the backside of the ear for resembling a conventional pair of eyeglasses. The lower surface 19 of the paddle portion is flat.

Paddle portion 15 houses a printed circuit board 21 which carries the electrical circuitry of the aid. Printed circuit board 21 is a conventional circuit board utilized in behind-the-ear hearing aids having its volume control wheel 23 located at the upper end of the board, as shown. An aperture 25 (FIG. 2) is formed in the top surface of paddle portion 15 in order to receive volume control wheel 23 of the behind-the-ear circuit board.

Referring to FIGS. 2 and 3, a raised portion or guard 27 is molded within the plastic of the aid bordering three sides of aperture 25. Guard 27 serves to prevent sweat or other moisture from entering aperture 25. As seen in FIG. 3, guard 27 angles transversely to the top surface 29 of the paddle portion. Top surface 29 curves downward in the area of the volume control wheel 23 when the hearing aid is worn by the operator. The wearing position of the hearing aid with respect to gravity is shown in FIG. 1.

Moisture or other water will move along top surface 29 of the paddle portion as the top surface slants downward. Raised portion or guard 27 serves to manuever moisture along top surface 29 preventing the moisture from entering aperture 25 as the moisture is carried by gravity.

Because guard 27 is slanted relative to curved surface 29, as best seen in FIG. 3, guard 27 also serves to provide a flat top surface 31 (FIG. 2) upon which the operator's finger slides during rotational movement of volume control wheel 23.

Referring again to FIG. 1, hearing aid 11 includes a conventional battery door 33 and an ON-OFF control switch 35. As understood, printed circuit board 21 includes electrical components (not shown) for providing amplification of the sound transmitted to the wearer.

As illustrated in FIG. 1, printed circuit board 21 has a lower surface 37 which has a curved shape for conforming with the curved housing of a behind-the-ear aid. In order to mount printed circuit board 21 in a fixed position relative to the flat surface 19 of the paddle portion, a pair of rectangular mounts 39, 41 serve to fix curved surface 41 relative to flat portion 19. Rectangular mounts 39, 41 are molded integral with paddle portion 15 and traverse the entire depth of the paddle portion. A pair of notches 43, 45 formed in board 21 serve to mate with mounts 39, 41 for establishing the position of board 21. Screws 51, 53, 55, 57, 59 serve to hold a removable side portion 61 (FIG. 2) to the remaining paddle portion; FIG. 1 illustrates the aid with side portion 61 removed. Screw receiving apertures are formed in board 21 to receive screws 51–59 and to further fix the printed circuit board into its proper location within paddle portion 15.

A conventional microphone 63 is positioned at the forward end of the temple portion 15. The microphone picks up sound and converts it to an electrical signal which is amplified by the circuitry of printed circuit board 21. The amplified signal is transmitted to a conventional receiver 65 for generation of sound waves. As shown in more detail in FIG. 4, a channel 67 is connected to the output of receiver 65 and provides an acoustical path for transmission of the sound waves to the wearer of the aid. Channel 67 ends in a nubbin portion 69 which extends out from the eyeglass temple portion. A short piece of tubing (not shown) is connectable to the nubbin portion for providing a conduit to carry sound to an ear mold (not shown) disposed in the wearer's ear.

Channel 67 is serpentine in shape and serves to compact the relatively long sound channel 67. The channel is rectangular in shape as shown, having an overall length and cross-sectional area to provide an acoustic path equivalent to that of a behind-the-ear hearing aid with its relatively long length of hook portion for holding the hearing aid into the ear. The exact shape of the cross-section of the channel and the exact shape of the serpentine path is relatively unimportant as long as the cross-sectional area and total length serve to provide an acoustic path equivalent to the behind-the-ear aid.

To provide a desirable frequency response, the relatively long tubing of the behind-the-ear aid is replaced with serpentine channel 67.

As shown in more detail in FIG. 5, serpentine channel 67 is constructed from a body portion 71 having a serpentine groove and a cover 73, which are cemented together during the manufacture of the aid. A pair of tubes 69, 75 provide an input and output path to channel 67. The cover 73 seals the open side of the groove, forming a closed serpentine path which connects the receiver to the sound outlet at nubbin 69.

It is to be understood, of course, that the foregoing describes embodiments of the present invention and that modifications may be made therein without departing from the spirit or scope of the present invention as set forth in the appended claims.

What is claimed is:

1. In an eye glass hearing aid having a paddle portion for placement behind the wearer's ear and for resting against the wearer's head, electrical circuitry housed within the paddle portion, an aperture positioned atop the paddle portion for providing a channel of communication to the electrical circuitry within the paddle portion, a control element positioned within the aperture and connected to the circuitry, said control element being controllable by the wearer in order to provide a controlling function with respect to the electrical circuitry, the improvement comprising a sweat guard positioned relative to the aperture for preventing moisture on the topside of the paddle from moving into the aperture during wearing of the hearing aid by the wearer, said sweat guard including a blocking member positioned adjacent at least a portion of the aperture, said blocking member providing a barrier raised above the topside of the paddle for blocking moisture on the topside of the paddle from running into the aperture.

2. The improvement according to claim 1 wherein said aperture is substantially rectangular and wherein said blocking member is positioned adjacent three of the sides of the aperture.

3. The improvement according to claim 2 wherein the plane of the aperture is transverse to the horizontal during normal wearing of the hearing aid, one side of the aperture being vertically lower than the other three sides during normal wearing of the hearing aid, and wherein said blocking member is positioned adjacent the said three sides.

4. The improvement according to claim 1 wherein said blocking members includes a flat surface upstanding from the topside of the paddle.

5. The improvement according to claim 1 wherein the control element includes a rotatable circular member and wherein said barrier provides a surface for sliding engagement with the wearer's finger during rotation of the circular member.

6. The improvement according to claim 1 wherein said barrier is contiguous to at least a portion of the aperture.

7. The improvement according to claim 1 wherein said barrier is formed integrally with the paddle portion of the hearing aid.

8. In an eye glass hearing aid having a casing which includes a paddle portion for placement behind the wearer's ear, the paddle portion having a flat planar bottom surface, the improvement comprising an amplifier circuit board housed within the casing in a fixed registration with said planar bottom surface, said circuit board having a curved bottom edge adapted to fit in the curved body of a behind-the-ear hearing aid, said casing including alignment means secured in said casing for providing surfaces of contact for meeting said circuit board for registering the curved surface of the board relative to said planar bottom surface, said alignment means including a pair of rectangular shaped mounts positioned on opposite sides of said paddle portion of said casing.

9. In an eyeglass hearing aid according to claim 8 and wherein said paddle portion includes a removable side portion; and wherein said alignment means includes a plurality of screws for holding said side portion into position.

* * * * *